INVENTOR
William W. Slaght
BY Evans + McCoy
ATTORNEYS

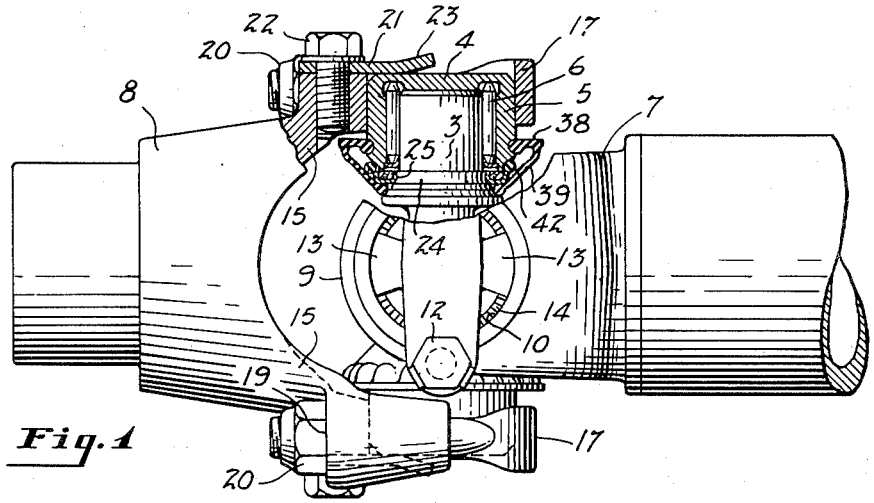
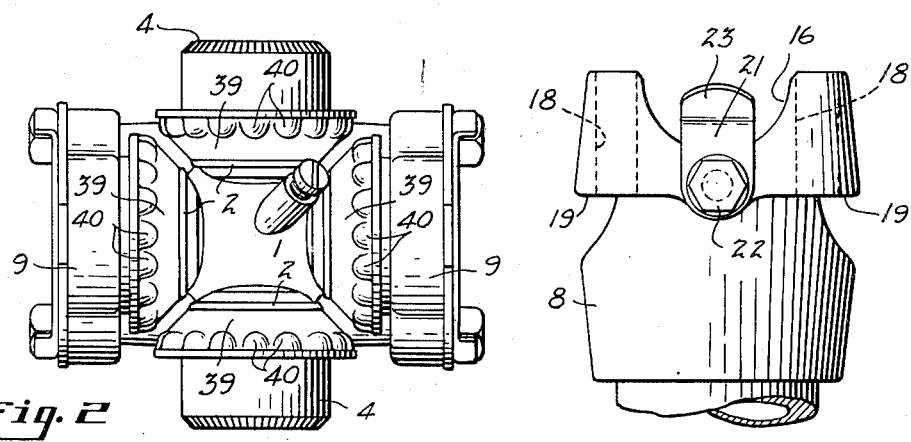
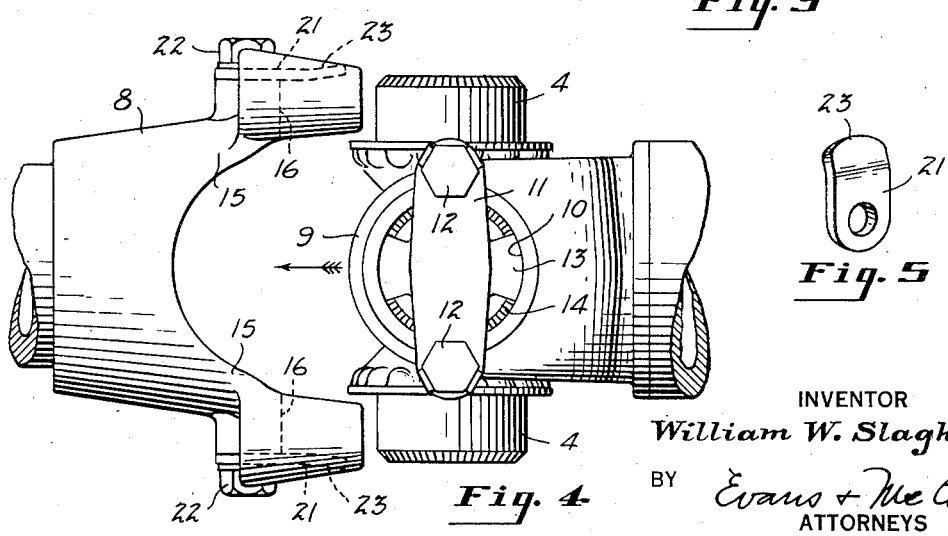

Dec. 11, 1956  W. W. SLAGHT  2,773,368
UNIVERSAL COUPLINGS WITH SEALED BEARINGS
Filed May 22, 1952  3 Sheets-Sheet 3

INVENTOR
William W. Slaght
BY Evans & McCoy
ATTORNEYS

United States Patent Office 2,773,368
Patented Dec. 11, 1956

2,773,368

UNIVERSAL COUPLINGS WITH SEALED BEARINGS

William W. Slaght, Rocky River, Ohio, assignor to Cleveland Steel Products Corporation, Cleveland, Ohio, a corporation of Ohio Application May 22, 1952, Serial No. 289,367

1 Claim. (Cl. 64—17)

This invention relates to universal torque transmitting couplings of the yoke and cross type such as commonly used to connect motor vehicle transmission shafts. In these couplings the cross has arms formed to provide trunnions at their ends and the arms are arranged to provide two pairs of axially alined trunnions. The shafts which are joined by the coupling each has a yoke at its end that is pivoted to oscillate on two alined trunnions of the cross. The cross trunnions are journaled in roller bearings carried by sleeves attached to the yokes.

Couplings of the type referred to are commonly provided with a sealing ring composed of a resilient packing material such as cork, rubber or the like on each cross arm inwardly of the trunnion that bears against the inner end of the bearing sleeve to close the annular opening between the sleeve and trunnion arm. Due to continuous oscillation of the sleeve on the trunnion during rotation of the coupling the sealing ring is constantly subjected to a rubbing action which tends to wear away the material of the sealing ring and gradually lessen the effectiveness of the seal. This wearing action is greatly accelerated when a motor vehicle is operated for extended periods in mud or sand because the sand or mud with which the coupling becomes incrusted works its way between the relatively movable bearing surfaces of the sleeve and sealing ring and greatly hastens the rate of wear. Military vehicles are frequently subjected to such severe operating conditions and the failures of the universal joints in such vehicles due to the escape of lubricant from the bearings and the entry of water and dirt into the bearings are quite common.

In the coupling of the present invention seals in addition to the conventional lubricant seal are provided around the open end of each bearing sleeve which serve to prevent access of water or abrasive particles to the relatively movable engaging surfaces of the bearing sleeve and lubricant sealing ring.

One of the additional seals is in the form of an elastic rubber sleeve or collar that has thickened inner and outer ends that are stretched around the trunnion arm and the bearing sleeve and that are held by tension stresses in tight sealing engagement with the trunnion arm and bearing sleeve inwardly and outwardly of the inner lubricant seal. The rubber sealing collar has a thin tubular elastic and flexible wall that is of greater diameter than the bearing sleeve and the packing retaining rings and that has sufficient flexibility to allow the ends of the collar to have relative turning movements through a substantial angle of oscillation of the bearing sleeve so that there is normally no slippage during operation between the ends of the sealing sleeve and the bearing sleeve and trunnion arm. The rubber sealing sleeves also serve as a retainer for holding the bearings on the cross trunnions, permitting the coupling to be shipped partially assembled and facilitating the assembly of the coupling.

In addition to the sealing sleeve, an intermediate seal is also provided in the form of an elastic rubber ring that is positioned within the rubber sealing collar and that has direct gripping engagement with the inner end of the bearing sleeve and the packing retainer on the trunnion arm that is immediately adjacent the inner end of the bearing sleeve. The inner rubber ring is preferably unattached either to the outer rubber sleeve or to the bearing sleeve and the rubber ring and the outer end of the rubber sleeve can be moved inwardly on the trunnion arm to a position clear of the bearing sleeve to facilitate assembly of the coupling. After assembly of the coupling the outer end of the rubber sleeve and the rubber sealing ring can be shifted outwardly to their sealing positions.

This invention has for its object to prolong the life of universal couplings by providing each bearing of the coupling with sealing means which not only retains lubricant in the bearing, but also prevents access of water and abrasive materials to the relatively movable engaging surfaces of the lubricant seal.

The invention also has for an object to provide an effective and durable seal for each bearing of the coupling that will not interfere with the assembly or disassembly of the coupling, that will not interfere with the relative movements of the coupling members and that will function effectively for long periods of time under severe operating conditions.

A further object of the invention is to provide a joint that has a lubricant seal for the trunnion bearings that also serves as a bearing retainer to hold bearings on the trunnions prior to assembly.

Reference should be had to the accompanying drawings forming a part of this specification, in which:

Figure 1 is a side elevation of a universal coupling to which the invention is applied, a portion of one of the trunnion arm yoke connections being broken away and shown in section;

Fig. 2 is an end elevation showing one of the coupling yokes connected to the cross and with bearing cups retained on the other trunnions by the flexible lubricant sealing collars;

Fig. 3 is a side elevation of the open seat yoke which receives the cross assembly shown in Fig. 2;

Fig. 4 is a side elevation showing the open seat yoke positioned to receive the free trunnion bearings of the assembly shown in Fig. 2;

Fig. 5 is a perspective view of one of the bearing cup retaining and guiding members carried by the open seat yoke;

Figure 6:
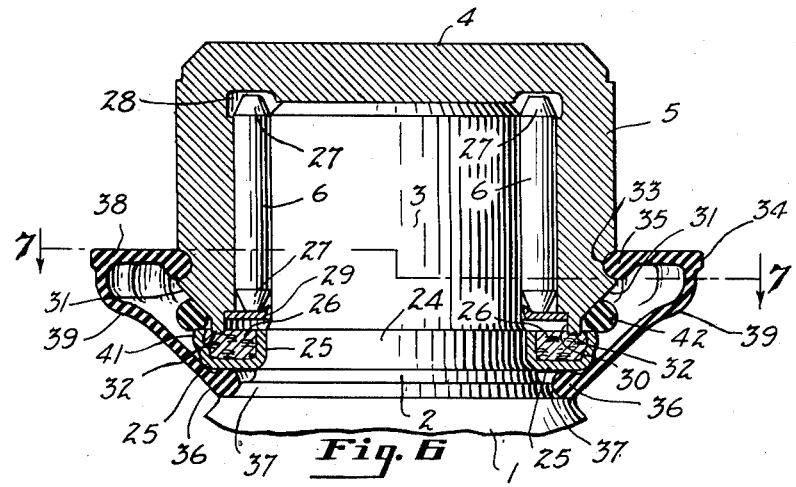
Fig. 6 is an axial section on an enlarged scale of one of the trunnion bearings.
Figure 7:
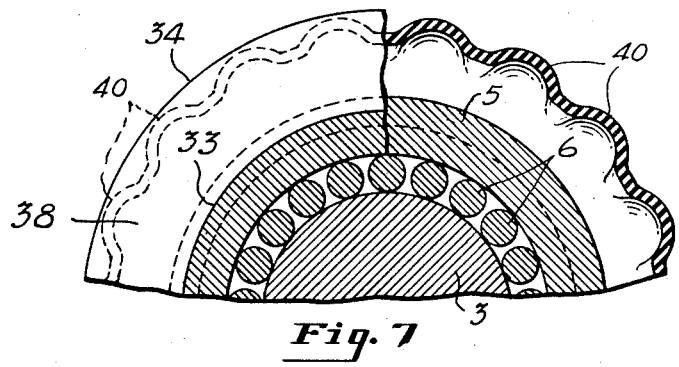
Fig. 7 is a fragmentary section taken on the line indicated at 7—7 in Fig. 6.

Referring to the accompanying drawings, the coupling of the present invention has a cross 1 provided with four equiangularly spaced arms 2 each terminating at its end in a trunnion 3, the trunnions of the cross being arranged in two axially alined pairs. Each of the four trunnions 3 is journaled in an anti-friction bearing that comprises a cup-shaped member 4 having a cylindrical sleeve 5 in which the trunnion is received. Bearing rollers 6 are mounted on the cup within the sleeve 5 for rolling engagement with the trunnions 3 and sleeve 5. The bearing cups 4 are attached to yokes 7 and 8 which have oscillating movement on the cross during rotation of the coupling when there is misalinement between the shafts connected by the coupling.

In the joint shown in Figs. 1 to 4 of the drawings, the yoke 7 has spaced arms 9 provided with alined openings 10 in which the bearing cups 4 of two axially alined trunnions of the cup fit. In securing the cross to the yoke 7 the bearing cups 4 are placed upon the trunnions 3 within the openings 10 from the outer side of the yoke arm after the trunnions have been inserted into the openings. After being so placed upon the trunnions the cups 4 fitting in the openings 10 are held in place by means of clamping plates 11 that are held against the outer faces of the arms 9 by bolts 12. In order to prevent turning movements of the cups 4 in the openings 10, the plates 11 have extensions 13 that engage ribbed bevels 14 at the outer peripheral edges of the cups.

The yoke 8 has spaced arms 15 that are provided with open semi-cylindrical seats 16 to receive the cylindrical sleeves 5 on the other two trunnions 3. The bearing cups 4 are secured to the seats 16 by means of U-bolt clamps 17 the legs of which extend through openings 18 on opposite sides of the seats 16. The openings 18 extend to an outwardly projecting shoulder 19 formed on the arms 15 and the U-bolt clamps are tightened on the bearing cups by means of nuts 20 that bear on the shoulder 19. The arms 15 are recessed at the outer end of the seats 16 to receive retaining plates 21 that are held in place by bolts 22. The plates 21 overlie the outer ends of the recessed seats 16 and each is provided with an inclined portion 23 at its outer end. The inclined portions 23 of the retaining plates are outwardly divergent to facilitate the entry of bearing cups mounted on the cross trunnions 3 into the bearing recesses.

Each of the cross arms 2 has an enlarged cylindrical portion 24 at the inner end of its trunnion 3 upon which a lubricant seal may be mounted. In the couplings used in power transmission shafts it is necessary to provide means for retaining lubricant in each bearing of the coupling. The lubricant seal commonly employed is an annular packing attached to the trunnion arm and bearing against the inner end of the bearing sleeve. A conventional lubricant seal is herein shown which, as best shown in Fig. 6, includes a retaining ring 25 that fits upon the enlarged portion 24 of the trunnion arm and that serves to hold a yielding resilient sealing ring 26 in position for engagement with the inner end of the bearing sleeve 5.

The rollers 6 have pointed ends 27, the outer pointed ends 27 extending into recesses 28 in the bottom wall of the cup and the inner pointed ends of the rollers engaging a retaining disk 29 that has a press fit in a counterbore 30 at the inner end of the bearing sleeve 5. The sleeve 5 has a beveled external shoulder 31 adjacent its inner end and a reduced end portion 32 that bears against the resilient sealing ring 26. In assembly of the coupling the inner ends 32 of the bearing sleeves are pressed against the lubricant retaining sealing ring 26 in order to provide an effective seal. The clamping plates 11 are so positioned when they are engaged with the outer faces of the yoke arms 9 that they press the bearing cups 4 against the sealing rings 26. The retaining rings 21 are so spaced that the reduced ends 32 of the bearing sleeve are pressed against the resilient lubricant retaining ring 26, the divergent inclined portions 23 of the retaining plates 21 serving to press the ends 32 into the sealing ring when the bearing cups on the trunnions are forced into the seats 16.

During rotation of the coupling each bearing sleeve has an oscillating movement on its trunnion and during such oscillating movements the inner end of the bearing sleeves have rubbing engagement with the lubricant retaining ring 26 which tends to gradually wear away the portion of the ring that engages the bearing sleeve. This wear is greatly accelerated when particles of abrasive material work their way between the engaging surfaces of the sleeve and sealing ring. When motor vehicles are operated for long periods of time in mud or sand as is often the case with military vehicles, failures of couplings often occur due to wear of the sealing ring, which permits escape of lubricant and entry of water and abrasive materials into the bearings.

The present invention provides additional seals externally of the conventional lubricant seal which prevent water or abrasive materials from reaching the relatively movable engaging faces of the bearing sleeve and lubricant retaining ring.

The sleeve 5 of the bearing cup 4 has an external groove 33 adjacent its inner end which extends around its periphery for engagement with a combined bearing retainer and sealing sleeve or collar 34. The collar 34 is formed of elastic rubber and has an outer beaded edge portion 35 that is stretched around the sleeve 5 and which fits in the groove 33. The collar 34 has a bead 36 at its inner end that is stretched around the trunnion arm 2 and that is wedged between the retaining ring 25 and a shoulder 37 formed on the arm 2 inwardly of the ring. The collar 34 has a flat outer end portion 38 and an outwardly bulged thin tubular wall 39 connecting the portion 38 to the inner end bead 36. The thin tubular wall 39 provides a flexible connection between the sleeve gripping arm portion of the collar and the arm gripping inner portion of the collar which permits oscillation of the bearing sleeve through a substantial angle with respect to the trunnion arm without slippage between the collar and sleeve or between the collar and trunnion arm. To further increase the torsional flexibility of the sealing collar the wall 39 may be provided throughout its circumference with flutes 40. As an extra precaution against entry of abrasive material to the inner loop of the seal, an additional seal is provided within the collar 34.

As best shown in Fig. 6, the retaining ring 25 has an outer flange 41 that provides a shoulder spaced from and opposed to the beveled shoulder 31 of the sleeve 5. An elastic rubber ring 42 which is preferably of substantially toroidal form is stretched around the inner portion of the bearing sleeve and has wedging engagement between the beveled shoulder 31 and the flange 41. The inner ring 42 provides protection for the main lubricant seal in the event of rupture of the wall 39 of the sealing collar.

It is common practice to provide transmission couplings having one yoke provided with bearing receiving eyes and the other with open bearing receiving seats in order to facilitate assembly and permit shipment of partially assembled couplings. The open seat yoke is commonly mounted on a shaft to which it is splined and serves as a protector for the splined end of the shaft during shipment. The cross is assembled with the other yoke and fastening means is commonly provided for holding the bearing cups on the free trunnions during shipment. The sealing collar of the present invention serves not only as a seal but also as a bearing retainer to hold the bearing cups 4 on the trunnions 3 during shipment, making it unnecessary to provide special devices for retaining the cups on the trunnion during shipment.

Figure 8:
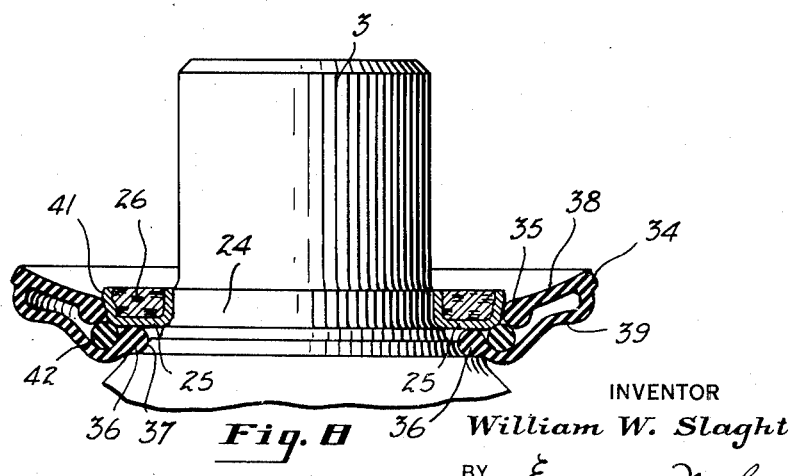
Fig. 8 is a sectional view showing one of the trunnions with the sealing and retaining collar collapsed in a position entirely clear of the trunnion and engaging the seal retaining channel to facilitate the mounting of the bearing cup on the trunnion.
Figure 9:
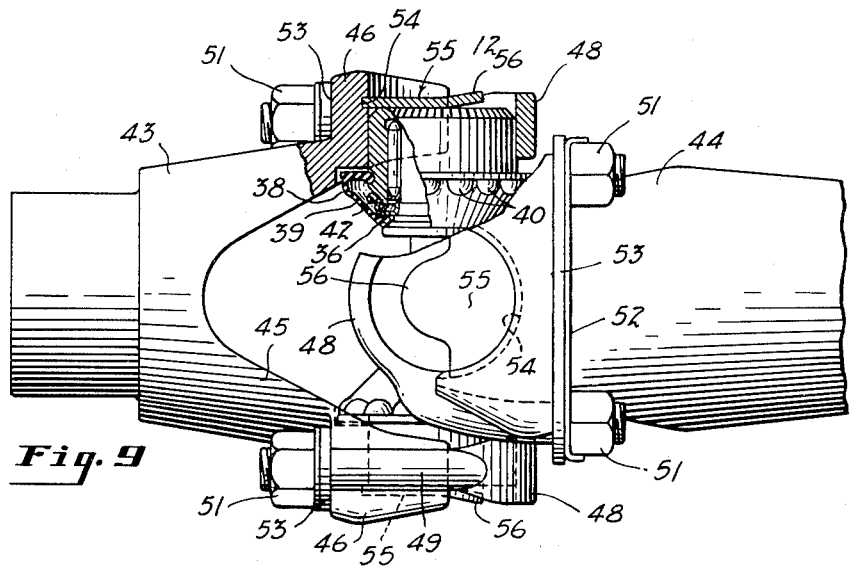
Fig. 9 is a side elevation showing a modified form of joint in which both yokes are of the open seat type, a portion of one yoke seat and its associated bearing clamp being shown in section.

In assembling a bearing cup on a trunnion of the cross the sealing collar 34 is collapsed as shown in Fig. 8 of the drawing to bring the bead 35 into engagement with the flange 41 of the retaining ring 25 and to position the inner sealing ring 42 between the beads 35 and 36. With the sealing collar so collapsed the bearing cup can be inserted on the trunnion 3, after which the outer end of the collar 38 may be pulled outwardly and placed in engagement with the groove 33 of the bearing sleeve. The movement of the collar 34 to a sealing position will move the inner ring 42 outwardly on the flange 41 and proper engagement of the ring 42 between the flange 41 and the shoulder 31 of the sleeve can be assured by applying pressure to the ring through the flexible wall 39 of the collar.

Figures 10, 11:
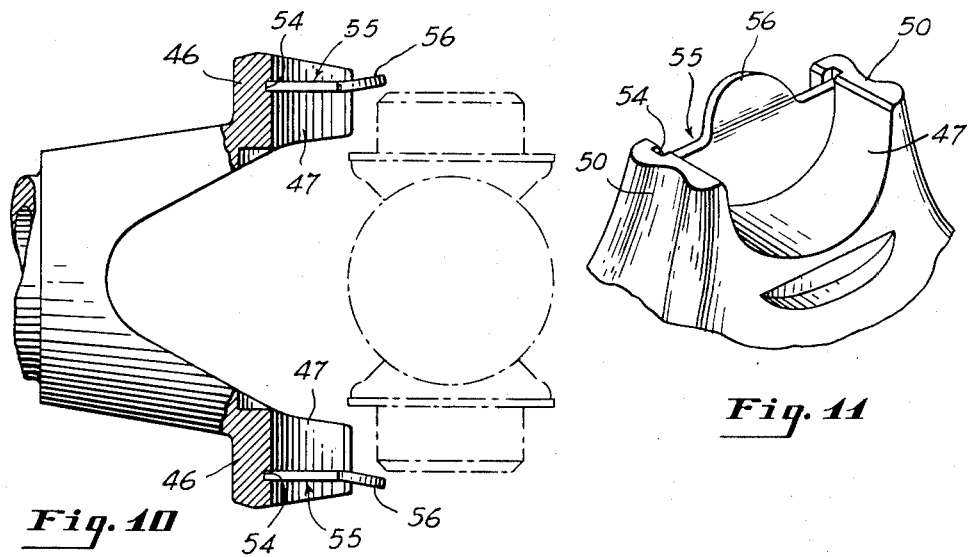
Fig. 10 is a side elevation of one of the yokes with the seat portions of the arms shown in section, a cross being shown in dotted lines with trunnion bearings thereon that are positioned for entry into the yoke seats.
Fig. 11 is a perspective view of one of the open bearing receiving seats of a yoke.
Figure 12:
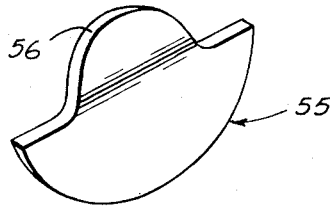
Fig. 12 is a perspective view of the bearing retaining plate carried by the yoke.

The sealing and bearing cup retaining means of the present invention can also be advantageously applied to couplings of the type in which both yokes are of the open seat type. In such couplings the bearing cups are assembled on the cross and retained in proper position thereon for assembly with the yokes. If desired the cross may be shipped separately from the yokes and assembled with the yokes attached to their shafts. Since the cross, bearing cups and bearing seals may be identical with those shown in Figs. 1 to 8, the same reference numerals are applied thereto in Figs. 9 to 12. The coupling is shown having yokes 43 and 44 which may have identical attachment to the trunnion bearings. The yokes 43 and 44 are each provided with spaced arms 45 having laterally extending end portions 46 provided with semicylindrical seats 47. The bearing cups 4 are clamped in the seats 47 by suitable U-bolt clamping members 48 that have legs 49 that straddle the laterally extending portions 26 of the yoke arms and that fit in external grooves 50 formed in the extensions 46. The ends of the legs 49 are threaded to receive nuts 51 which are screwed against a lock plate 52 engaging shoulders 53 on the sides of the extensions 46 opposite the seats 47. Adjacent the outer end thereof each of the seats 47 has a groove 54 which extends across the same and in which fits a retaining plate 55 which is of substantially semi-circular form shaped to fit in the semi-circular groove 54. Each of the retaining plates 55 has an inclined tab 56 which serves as a guide to press the bearing cups 4 inwardly into engagement with the lubricant sealing ring as the cross is being forced into the seats 47. Inwardly of the seats 47 the arms 45 may be recessed at 57 to accommodate the sealing collars 34. In the final assembly operation the sleeves are engaged with the sealing rings under the desired pressure due to the inward movement of the bearing sleeves on the trunnions as they are being forced inwardly between the inclined tabs 56 of the retaining plate. The plates 55 may be secured in fixed position by peening in the wall of the grooves 54 outwardly of the plates as indicated at 57 in Fig. 11.

It is to be understood that in accordance with the provisions of the patent statutes, variations and modifications of the specific devices herein shown and described may be made without departing from the spirit of the invention.

What I claim is:

A universal joint comprising a cross with arms each terminating in a trunnion and having two pairs of axially alined trunnions, each of said arms having a yielding resilient sealing ring extending around the same inwardly of said trunnion, means for securing said rings to said arms and holding the same against bodily movements axially of the trunnions, a bearing on each trunnion that has an internally cylindrical sleeve and rollers within the sleeve that have rolling engagement with the trunnion and sleeve, said sleeve having an inner end face slidably engaging said sealing ring and being provided with an external groove extending around the same near its inner end, a combined sealing and bearing retaining collar of elastic rubber having an outer end portion embracing said sleeve and engaging in said groove, an inner end portion embracing said arm inwardly of said sealing ring and an outwardly bulged thin flexible tubular wall connecting said end portions, yokes having arms to which said bearing sleeves are attached, one of said yokes having arms provided with open sleeve receiving seats alined transversely of the yoke axis, stop plates attached to said arms for engagement with the outer ends of the sleeves engaging the seats, said plates having inclined outwardly flaring outer end portions for engagement with the outer ends of axially alined sleeves to move the said sleeves inwardly on said trunnions and press the same against said yielding resilient sealing rings, and means for clamping the bearing sleeves to said open seats.

References Cited in the file of this patent

UNITED STATES PATENTS

| | | |
|---|---|---|
| 1,959,259 | Zerk | May 15, 1934 |
| 2,020,253 | Braun | Nov. 5, 1935 |
| 2,027,078 | Warner | Jan. 7, 1936 |
| 2,209,855 | Slaght | July 30, 1940 |
| 2,253,300 | Karlberg | Aug. 19, 1941 |
| 2,485,504 | Morgan | Oct. 18, 1949 |